Feb. 10, 1948.   E. H. LAND   2,435,717
DEVELOPING CAMERA UTILIZING A FILM, ANOTHER SHEET
MATERIAL, AND A FLUID PROCESSING AGENT
Filed Oct. 6, 1945   2 Sheets-Sheet 1

Inventor:
Edwin H. Land
Donald L. Brown
By Attorney

Feb. 10, 1948.  E. H. LAND  2,435,717
DEVELOPING CAMERA UTILIZING A FILM, ANOTHER SHEET
MATERIAL, AND A FLUID PROCESSING AGENT
Filed Oct. 6, 1945  2 Sheets-Sheet 2
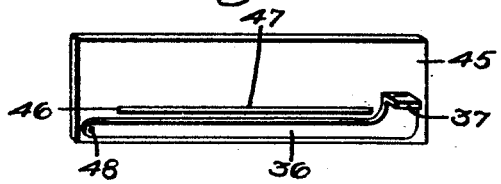
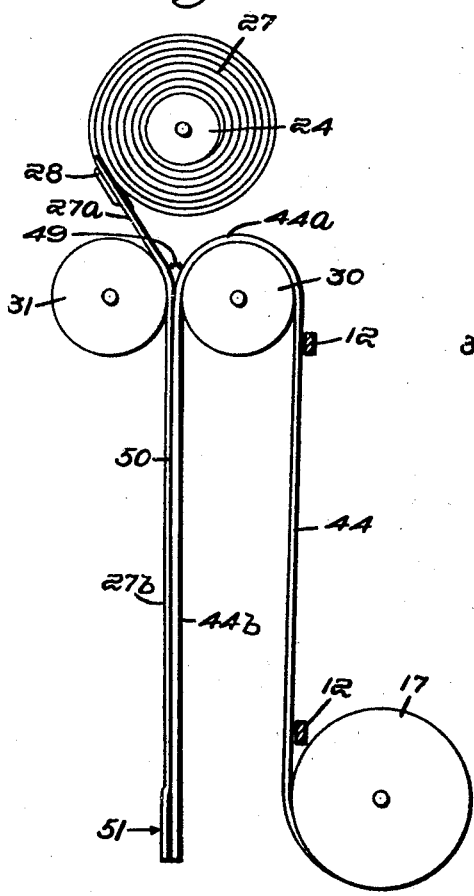
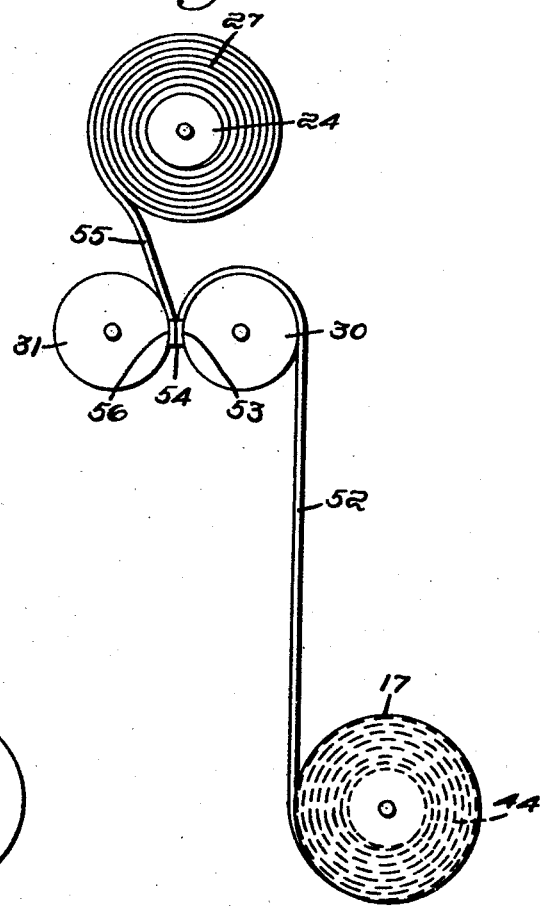

Patented Feb. 10, 1948

2,435,717

UNITED STATES PATENT OFFICE 2,435,717

DEVELOPING CAMERA UTILIZING A FILM, ANOTHER SHEET MATERIAL, AND A FLUID PROCESSING AGENT

Edwin H. Land, Cambridge, Mass., assignor to Polaroid Corporation, Cambridge, Mass., a corporation of Delaware Application October 6, 1945, Serial No. 620,744

16 Claims. (Cl. 95—13)

1

This invention relates to photography, and more particularly to camera apparatus.

This application is a continuation-in-part of my copending application Serial No. 578,379, filed February 17, 1945, for Photographic products.

One object of the present invention is to provide a novel camera apparatus for forming fixed positive photographic images of subject images to which a photosensitive film is exposed while in said apparatus.

Another object of the present invention is to provide a novel camera apparatus wherein a photosensitive film may be photographically exposed and so combined with sheet material releasably containing a liquid that positive prints of the subject images to which the film is exposed may be formed in the said sheet material.

A further object of the present invention is to provide a novel apparatus adapted to serve as an attachment on a conventional camera, said attachment being interchangeable with the camera back and embodying means for forming a fixed positive print of subject images to which a photosensitive film is exposed in the said camera.

Still another object of the present invention is to provide a camera apparatus comprising means for releasably containing a liquid reagent mixture, for example a viscous liquid, and for releasing and spreading the said liquid upon photographically exposed areas of a photosensitive film to develop the said film areas and provide image-forming components therein.

A still further object of the present invention is to provide a camera apparatus comprising means whereby photographically exposed areas of water-permeable photosensitive film may be subjected to a liquid adapted to permeate and develop the said exposed areas and provide therein image-forming components and whereby the said liquid-permeated film areas may be combined with predetermined areas of a material suitable for the formation of fixed positive images for the purpose of providing therewith positive photographic prints.

Yet further objects of the present invention are the provision of a camera device comprising means for providing a light-tight closure or closures whereby a film material may be removed or discharged from the main camera chamber without admitting light into said chamber; of a camera device comprising means for retaining a film discharged from the main camera chamber so that it is not exposed to actinic light; and of a camera device comprising means for severing

2 film lengths discharged from the main camera chamber.

These and further objects of the invention will in part be obvious and will in part appear hereinafter.

The invention accordingly comprises the apparatus possessing the construction, combination of elements and arrangement of parts which are exemplified in the apparatus hereinafter described, and the scope of the application of which will be indicated in the claims.

In the drawings, wherein like reference characters refer to like parts throughout the several views:

Figure 1 is a perspective view, with parts cut away, representing the novel apparatus of the invention in the form of an attachment for replacing the back of a conventional camera, said camera and attachment being shown loaded, respectively, with a photosensitive film, positioned for exposure to a subject image and with a supply of sheet material, for example a strip of coated paper, embodying liquid-carrying containers, adapted to serve as a base strip for positive photographic images;

Fig. 3 is a plan view along the line 3—3 of Fig. 1, viewed vertically upward, and illustrates a cutting device for severing lengths of combined film and base strip after their egress from combining means shown in Fig. 1;

Figures 1, 2:
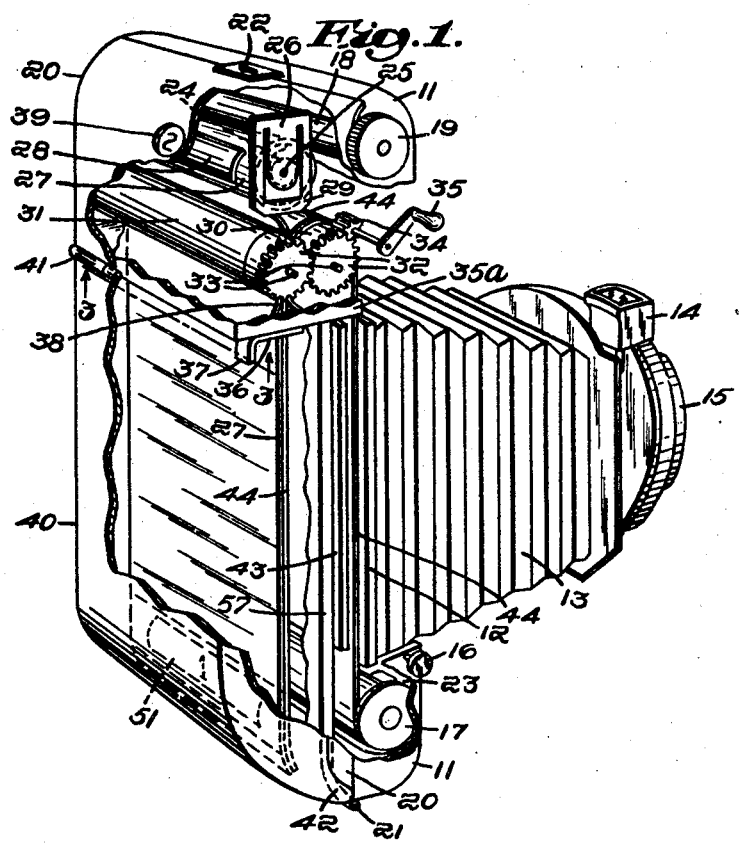
Fig. 2 is an elevation view of the several housing elements of the camera and camera attachment apparatus of Fig. 1 with particular reference to such portions as may be opened for loading and threading the film and base strip or for removal of severed combined portions thereof.

Fig. 4 is a schematic elevation view of elements in Fig. 1 utilized for supplying and metering the film and base strip into substantially face-to-face relationship, for releasing the liquid from the liquid-carrying containers, and for spreading the said liquid over contiguous surfaces of film and base strip; and Fig. 5 is a schematic elevation view of components shown in Fig. 4 and illustrates a method of mutually attaching leaders of the film and base strip, respectively, to insure release and spreading of the container-carried liquid over designated areas of the contiguous film and base strip and to obtain the combination of the said areas in the process of forming positive photographic prints therein.

The novel camera apparatus comprehended by the present invention may be embodied in an attachment for usage in combination with a portion of a conventional camera, for example a camera of the roll-film folding type, or it may form a part of a complete camera apparatus having suitable shutter and lens means, wherein the novel structural elements, herein described, may be permanently incorporated. Accordingly, where the terms camera and camera attachment are hereinafter used, it will be understood that a limiting designation is not thereby intended and that either of the embodiments above referred to, being substantially similar in design, may be comprised within the meaning of the descriptive language used.

The aforementioned novel camera apparatus comprises elements for supplying a strip of paper or other suitable material capable of serving as a base material or receiving layer for positive photographic prints, for example a strip of the like material supplied in roll form, the said base strip embodying at least one and preferably a plurality of liquid-carrying containers. Containers and carried liquid suitable for incorporation with the said base strip are described in my copending application Serial No. 578,379, filed February 17, 1945, for Photographic products. Liquid-carrying containers are preferably spaced along the longitudinal axis of the base strip in such manner as to provide predetermined clear surface areas of the strip adjacent each of the said containers. The liquid carried within the aforementioned containers comprises a liquid reagent mixture, for example a viscous liquid, capable upon release to a said adjacent base strip area and to a juxtaposed and photographically exposed portion of a photosensitive film, for example a standard roll film, of permeating at least the surface portions of said film portion to provide therein a developed negative image of the subject image and an image-forming component. The said image-forming component is adapted to form, either in the photosensitive film or within and/or upon the said adjacent base strip portion, a positive print of the subject image. To accomplish the above-described process, novel devices are provided for metering each said photographically exposed portion of film into adjacent, substantially face-to-face relationship with a predetermined area of the said base strip, for releasing and spreading the said liquid reagent mixture over the aforementioned adjacent surfaces of sheet material, for retaining the said film and base strip in their assembled relation in the absence of actinic light until a positive photographic print is obtained, and for severing lengths of the said combined layers to obtain individual photographic prints. The apparatus described herein provides means for performance of an inclusive process comprising the exposure of a photosensitive film to subject images and the formation of fixed positive photographic prints, the said formation of prints being in rapid sequential relationship to the aforesaid photographic exposures.

Referring to Fig. 1, a conventional roll-film folding camera is shown, in part, and includes housing 11, framing plate 12, bellows 13, view finder 14, lens 15, shutter release 16, film supply means 17, takeup spool 18, and takeup knob 19. It will be noted, in the example illustrated, that the takeup spool 18 and knob 19 are not utilized and that the conventional camera back has been removed and replaced by the apparatus of this invention in the form of an attachment, without other modification of the camera per se. Inasmuch as similar joining means are suitable for attaching either the camera back, or a housing 20 associated with the said novel apparatus, to the camera housing, it will be evident that the said camera element may be employed alone in a conventional manner by replacing the camera back, or may be utilized in conjunction with apparatus for positive print formation as illustrated. Housing 20, providing in closed position an enclosure impervious to the entrance of light actinic with respect to the photosensitive film and containing in large part the said novel apparatus, is attached to the camera housing by hinge 21 (Figs. 1 and 2) and latch 22, being thereby adapted for opening and access both to film loading chamber 23 and to the apparatus within housing 20 itself.

The apparatus within housing 20 comprises a rotatable spool 24 (Fig. 1), removably mounted in clip device 25 of brackets 26, one bracket only being shown, and the said spool serving to releasably hold a supply of the above-described base strip 27 embodying liquid-carrying containers 28. The said brackets 26 are provided with extended lower portions 29 for the purpose of guiding the released base material downward with respect to spool 24, the aforesaid brackets being attached to the walls of housing 20.

Positioned substantially beneath and closely adjacent bracket 26 is mounted a pair of pressure rollers 30 and 31, having their respective axes preferably lying substantially within a single horizontal plane at a predetermined distance apart, the said rollers being made of or surfaced with rubber or other suitable resilient material or having surfaces of steel or other appropriate metal. Mutually engaged spur gears 32 are attached to shafts 33 which, in turn, are rigidly fixed to the aforementioned pressure rollers providing means whereby rotation of a given gear is accompanied by rotation, in a similar direction, of the roller fixedly mounted on the shaft therewith. A pinion gear 34 is so mounted as to engage one of the aforementioned spur gears and may be rotated by handcrank 35, integral with the pinion gear shaft or the handcrank may be attached directly to a pressure roller shaft. It will be apparent, for example, that a clockwise rotation of the handcrank and integral pinion gear will cause rotation of the said mutually engaged spur gears and respectively attached pressure rollers in opposite directions relative to each other in such manner as to propel a sheet material or materials inserted between and gripped by the said rollers. Where, as illustrated in Fig. 1, two sheet materials pass between the pressure rollers in face-to-face relationship and more particularly where a liquid, for example a viscous liquid, covers the said facing areas, as described herein, it is desirable that means to sure simultaneous uniform propulsion of both of the said sheets, i. e., to prevent slippage thereof, be provided. The said means comprise the powering of both rollers, the roller surfacing materials utilized, and the predetermined diameter of and axial distance between the said pressure rollers. It will also be understood that means to insure rotation of each pressure roller in a given direction only are preferably included in the driving mechanism thereof, the said means comprising, for example, a conventional unidirectional clutch or ratchet and pawl device, not shown, associated with the shaft bearing pinion gear 34.

Frame members, not shown, for mounting the said pressure rollers and associated driving gears may be attached to a wall of housing 20, as for example to wall or frame portion 35a, the latter also serving as a member for mounting a cutting device for severing lengths of combined film and base strip. The said cutting device may comprise a fixed cutting blade, integral with a plate 45 (Fig. 3) attached to the underside of frame 35a, and a movable cutting blade 36 acuated by handle 37, and said movable blade being capable of lateral movement across the said fixed blade and an associated slot 46 (Fig. 3) through which the combined sheet materials are emitted to the said cutting means. Also attached to frame 35a (Fig. 1) and positioned beneath pressure rollers 30 and 31, to form an aperture for the passage of sheet material, the said aperture having its direction perpendicular to the axes of the pressure rollers, are guide and light-shield elements 38. The said elements function to prevent light, actinic with respect to the film, from entering the areas of the pressure rollers, framing plate, and film supply means and further serve as guides for the combined film and base strip immediately after their emission from the pressure rollers.

A viewing window 39 comprising an aperture in housing 20 and a suitable filter therein for substantially preventing the transmission of actinic light perform the conventional functions of permitting frame counting and indicating correct exposure position of the film. It will be noted that the said window is remotely situated with respect to the photosensitive film, a condition possib'e because the metering indicia may be printed on the base strip, the said base strip moving positively with respect to the film between the pressure rollers, as above described. Accordingly, frame-counting and film-positioning means are provided which substantially eliminate the possibility of light striking the said photosensitive film except through predetermined exposure means.

Housing 40, attached to housing 20 by hinge 41 and friction contact 42 (Figs. 1 and 2) is adapted to compose three sides of a light-tight compartment, the fourth side thereof being formed by a wall of housing 20, namely, inner wall 57. Immediately forward of wall 57 is positioned a pressure plate 43 and pressure plate spring, not shown, the said plate and spring being of conventional design and serving to hold film 44 firmly in exposure position against framing plate 12. Housing 40, swung to open position, provides access means to cutting elements 36 and 37 thereby permitting removal from the aforementioned compartment of severed lengths of combined sheet materials embodying positive photographic prints. It will be understood, however, that cutting handle 37 may be of extended length and, for example, pivoted with respect to cutting blade 36 whereby the said handle may protrude through a wall of housing 20 or that a modified cutting device may be employed to permit severance of combined strip materials without the necessity of opening housing 40.

In Fig. 2, the respective housing elements of Fig. 1 are shown in open position, and it will be noted that housing 20 swings away from camera housing 11 permitting access to the interior of both of said housings 20 and 11. In turn, housing 40 swings open from housing 20 and, in closed position, forms a light-tight compartment therewith.

Referring to Fig. 3, the cutting device for severing lengths of combined film and base strip is shown in greater detail. The said element comprises mounting plate 45, the same being adaptable to mounting on under portions of frame 35a of Fig. 1 and having therein slot 46 with fixed cutting blade 47 forming one edge of the said slot. Movable cutting blade 36, actuated by handle 37, is pivoted to plate 45 by pin 48. A predetermined length of combined film and base materials, having passed through the slot, may be severed by drawing the movable blade across the said slot and associated fixed blade.

Figs. 4 and 5 illustrate the operative relationship of apparatus to film and base layers. Referring to Fig. 4, a length of photosensitive film 44 is shown, drawn from supply means 17 and in position for exposure to a subject image in the area bounded by framing plate 12, a side member of which is shown in Fig. 1 and top and bottom members thereof being shown in Fig. 4. A further length of the film 44, numbered 44a, is represented as passed substantially half around pressure roller 30 to a position between the said roller and pressure roller 31. In turn, a length of the receiving layer or base strip 27, embodying liquid-carrying containers 28 at spaced intervals thereof, and numbered 27a, is represented as drawn from supply spool 24 and passing between the said pressure rollers. Pressure rollers 30 and 31, being surfaced as hereinbefore described, having their said surfaces in contact or closely adjacent one with the other as predetermined by surface materials used and film and base strip requirements, and being driven by the gearing 32 and 34 and handcrank 35, illustrated in Fig. 1, are thereby adapted to meter the said film and base layer into face-to-face relationship between the said pressure roller surfaces. It will be evident that further rotation of the pressure rollers from the positions shown in Fig. 4 will meter additional lengths of film and base layer between the said pressure rollers and respective positions of film and base strip are such that the said metering will bring that portion of the base strip 27a embodying a liquid-carrying container 28 to the area of pressure between the said rollers immediately prior to the arrival at the same point of the exposed frame of film 44 shown positioned in framing plate 12. Upon the simultaneous application of mechanical stress to the said liquid-carrying container and adjacent portion of film through the compressive force of the pressure rollers, the contained liquid is thereby released to the substantially angular interface area 49. Continued rotation of the pressure rollers serves to spread the said released liquid over the narrowing interface area of film and base strip until an area of each of the said surfaces at least equal to that of the exposed area of film is covered by the said liquid. While passing through the pressure rollers, the film and base strip are compressed and emerge therefrom as a single composite sheet material comprising film 44b and base layer 27b, extending substantially vertically downward from the pressure rollers. A coating of the reagent mixture 50 is shown lying between said film and said base strip or layer. As illustrated in Fig. 4, exhausted container 51 is represented as having previously passed between the pressure rollers whereby its contents 50 have been dispensed between film 44b and base strip 27b.

Fig. 1 further illustrates the relative operational positions of base strip, liquid containers, and photosensitive film during the novel photographic process. As shown, exhausted container, numbered "1" on the backing surface thereof, has served its function and dispensed liquid to combined portions of exposed film 44 and base layer 27 enclosed in compartment 40. Liquid-carrying container 28, numbered "2" on the backing surface thereof, the said number being visible through the viewing window 39, is in position for further metering to the pressure rollers 30 and 31 whereby dispensing of the said carried liquid to that area of photosensitive film 44, shown positioned in the framing aperture 12 and designated for combination with an area of base strip following container 28 may occur. For the purposes of illustration, in Figs. 1 and 4 leaders have been omitted from the said film and base layers, it being understood that sufficient space is provided in compartment 40 to accommodate an accumulation of leader material and that the said leaders may be separated from the composite strip upon removal of the latter from housing 40.

In the process whereby positive photographic prints are formed by the above-described method of dispensing a liquid to substantially facing surfaces of a photographically exposed film and a base strip and the combining of the said surfaces by pressure means, it has been implied that at least the film material is permeable to the said liquid and that the base or receiving layer may be thus permeable. Suitable photosensitive film, base strip materials, and liquid reagent mixtures adapted to form positive photographic prints in conjunction with the apparatus of this invention are described in my copending application Serial No. 578,379, filed February 17, 1945, for Photographic products. It should be understood, however, that any other combination of sheet or strip materials permitting the release and spreading of a liquid embodied in or carried by one of the said materials over facing surfaces of the said materials, and the combining of the said materials by substantially similar means to those described herein, may be utilized in conjunction with the novel apparatus of this invention. In the process of forming positive prints, the combined exposed film and base strip are held in assembled position for a period of time, and during the said time period it is desirable that light actinic with respect to the photosensitive film be prevented from striking the said film. Assuming that the film possesses no opaque backing layer, the light-tight function of compartment 40 during the said process of image formation becomes apparent and the opening of the said compartment, for severance and removal of the combined film and base layers, is to be performed only after the said formation of a positive print or, for example, after an elapsed time predetermined as to duration by factors comprising type of film, nature of liquid reagent, and base strip material utilized. Upon removal of a severed portion of combined materials from compartment 40, the film and base layers thereof may be stripped, one from the other, to reveal the fixed positive photographic print. It should be understood, however, that the design of the apparatus is not limited by the necessity for compartment 40 and that the photosensitive film may have an opaque backing and the base strip may be of an opaque material whereby actinic light may be prevented from striking the combined photosensitive film and base strip materials during the positive image-forming process. Strip and film materials thus constructed may be metered directly through an exit port, not shown, of the camera or attachment housing after emission from pressure rollers 30 and 31, and thereafter severed and stripped one from the other upon completion of an elapsed time necessary to the aforesaid process of forming positive prints.

With reference to Fig. 5, a procedure is shown for threading leaders of the film and base strip to insure that frames of film, base strip areas, and liquid-carrying containers will be properly positioned within the apparatus during the interrelated processes of exposure of the film to a subject image, release of the carried liquid, spreading of the released liquid to substantially facing areas of film and base strip, and combination of the said areas of film and base strip. A leader 52, for example a conventional roll film leader of photosensitive film 44, is provided at its extremity with a tab 53, the said tab being coated on one side with an adhesive 54. A leader 55, of predetermined length with respect to the film leader, and tab 56 are provided for base strip 27. The said tabs are superposed and combined by the said adhesive means thereby joining the respective extremities of the film and base strip. Combined tabs may then be threaded between pressure rollers 30 and 31, as shown in the illustration, and lengths of leader material metered until positioning of the film in the framing plate 12 of Fig. 1 is indicated by the number appearing in viewing window 39. It will be understood that respective leaders of film and base strip are of such predetermined relative length that a liquid-carrying container, an associated area of base strip, and a frame of photographically exposed film are thereby drawn between the pressure rollers in proper sequence or coincidence according to the predetermined requisite position of one with respect to another during the process of forming a positive photographic print, as hereinbefore discribed.

Since certain changes in the constructions set forth which embody the invention may be made without departing from its scope, it is intended that all matter contained in the above description, or shown in the accompanying drawings, shall be interpreted as illustrative and not in a limiting sense.

What is claimed is:

1. An attachment for a camera, which attachment is capable of processing a film exposed in said camera, said attachment comprising, in combination, casing means for providing with the camera to which said attachment is attached a chamber dry and opaque to light actinic to said film and apparatus for processing said film in conjunction with a roll of another sheet-like material and a processing fluid, said apparatus being contained in said chamber and comprising means out of contact with said fluid for successively advancing each exposed surface area of said film and substantially equivalent surface portions of said other material to surface-to-surface relationship and for applying a compression thereto throughout areas coextensive with each said area, and means for releasably holding a roll of said other material in a position for superimposition with said film after withdrawal of the latter from the exposure chamber of said camera, said means for applying compression acting, in cooperation with said film and sheet material and without contacting said processing fluid, to spread the processing fluid in the form of a layer throughout said areas of said film.

2. Apparatus for exposing a photographic film and for processing said film in conjunction with another sheet material and at least one container which releasably holds a liquid capable of carrying out said processing, said apparatus comprising, in combination, means for mounting a supply of said film, means defining an exposure opening for exposing a predetermined area of said film, means for mounting a supply of said other sheet material separately from said film, means providing a dry processing chamber, and means comprising a pair of pressure-applying members contained in said chamber between which the exposed area of said film is advanced in superposed relation with said other sheet material with said container located therebetween, said members acting, in cooperation with said film and said sheet material and without contacting said processing liquid, to spread the contents of said container throughout a predetermined portion of said exposed area to process the same.

3. Apparatus for exposing a photographic film and for processing said film in conjunction with another sheet material and at least one container which releasably holds a liquid capable of carrying out said processing, said apparatus comprising, in combination, means for mounting a supply of said film, means defining an exposure opening for exposing a predetermined area of said film, means for mounting a supply of said other sheet material separately from said film, means providing a dry processing chamber, means comprising a pair of pressure-applying members contained in said chamber between which the exposed area of said film is advanced in superposed relation with said other sheet material with said container located therebetween, said members acting, in cooperation with said film and said sheet material and without contacting said liquid, to spread the contents of said container throughout a predetermined portion of said exposed area to process the same, and means providing a second chamber opaque to light actinic to said film, said last-named means having a passage formed therein adjacent said pressure-applying members, said passage permitting said superposed film and sheet material to advance into said second chamber while preventing the passage therethrough of light actinic to said film, said second chamber being dimensioned to receive at least an area of said superposed film and said sheet material equal to the area of film adapted to be exposed by said film exposure means.

4. Apparatus for exposing a photographic film and for processing said film in conjunction with another sheet material and at least one container which releasably holds a liquid capable of carrying out said processing, said apparatus comprising, in combination, means for mounting a supply of said film, means defining an exposure opening for exposing a predetermined area of said film, means for mounting a supply of said other sheet material separately from said film, means providing a dry processing chamber, means comprising a pair of pressure-applying members contained in said chamber between which the exposed area of said film is advanced in superposed relation with said other sheet material with said container located therebetween, said members acting, in cooperation with said film and said sheet material and without contacting said liquid, to spread the contents of said container throughout a predetermined portion of said exposed area to process the same, means providing a second chamber opaque to light actinic to said film, said last-named means having a passage formed therein adjacent said pressure-applying members, said passage permitting said superposed film and sheet material to advance into said second chamber while preventing the passage therethrough of light actinic to said film, said second chamber being dimensioned to receive at least an area of said superposed film and said sheet material equal to the area of film adapted to be exposed by said film exposure means, and means for severing predetermined lengths of said superposed film and other sheet material.

5. Apparatus for exposing a photographic film and for processing said film in conjunction with another sheet material having mounted thereon a plurality of containers, each of which releasably holds a liquid capable of carrying out said processing, said apparatus comprising, in combination, means for mounting a roll of said film, means defining an exposure opening adjacent said mounting means for exposing a predetermined area of said film, means for mounting a roll of said other sheet material, said second-named mounting means being located on the side of said exposure opening remote from said first-named mounting means, means comprising a pair of pressure-applying members located adjacent the same side of said exposure opening as said second-named mounting means, said film being advanced after exposure over one of said members and brought between said members into superposed relation with said other sheet material with at least one of said containers being located adjacent the leading edge of said exposed area, and means providing a chamber opaque to light actinic to said film, said last-named means having a passage formed therein adjacent said pressure-applying members, said passage permitting said superposed film and sheet material to advance into said chamber while preventing the passage therethrough of light actinic to said film, said chamber extending substantially parallel to the plane of exposure of said film and being at least partly coextensive with said exposure area whereby said film is adapted to be advanced into said chamber in a direction opposite but parallel to the direction in which it advances to said pressure-applying members.

6. Apparatus for exposing a photographic film and for processing said film in conjunction with another sheet material and at least one container which releasably holds a liquid capable of carrying out said processing, said apparatus comprising, in combination, means for mounting a supply of said film, means defining an exposure opening for exposing a predetermined area of said film, means providing a dry processing chamber, means comprising a pair of pressure-applying members contained in said chamber between which the exposed area of said film is advanced in superposed relation with said other sheet material with at least one of said containers located therebetween, said members cooperating with said film and said sheet material as the latter are advanced therethrough to spread the contents of said container, without contacting said contents, throughout a predetermined portion of said exposed area to process the same, and means providing a chamber opaque to light actinic to said film, said last-named means having a passage formed therein adjacent said pressure-applying members, said passage permitting said superposed film and sheet material to advance into said opaque chamber while preventing the passage therethrough of light actinic to said film, said opaque chamber being dimensioned to receive at least an area of said superposed film and said sheet material equal to the area of film adapted to be exposed by said film exposure means.

7. Apparatus for exposing a photographic film and for processing said film in conjunction with another sheet material having mounted thereon a plurality of containers, each of which releasably holds a liquid capable of carrying out said processing, said apparatus comprising, in combination, means for mounting a roll of said film, means defining an exposure opening adjacent said mounting means for exposing a predetermined area of said film, means for mounting a roll of said other sheet material, said second-named mounting means being located on the side of said exposure opening remote from said first-named mounting means, means comprising a pair of pressure-applying rollers located adjacent the same side of said exposure opening as said second-named mounting means, said film being advanced after exposure over one of said rollers and brought between said rollers into superposed relation with said other sheet material with at least one of said containers being located adjacent the leading edge of said exposed area, and means providing a chamber opaque to light actinic to said film, said last-named means having a passage formed therein adjacent said pressure-applying rollers, said passage permitting said superposed film and sheet material to advance into said chamber while preventing the passage therethrough of light actinic to said film, said chamber extending substantially parallel to the plane of exposure of said film and being at least partly coextensive with said exposure area whereby said film is adapted to be advanced into said chamber in a direction opposite but parallel to the direction in which it advances to said pressure-applying rollers.

8. Apparatus for exposing and processing a photographic film in conjunction with another sheetlike material which is advanced to superposition with said film and in conjunction with a processing fluid which is located between said film and said other sheet material when the latter are superposed, said apparatus comprising, in combination, means defining an exposure opening for exposing said film, means forming a dry processing chamber, means contained within said chamber for bringing at least an exposed surface of said film and a surface of said other material into face-to-face relationship and for applying compression thereto throughout at least an area coextensive with said exposed surface, and means for releasably holding a supply of said other sheetlike material for superimposition with said film, said last-named means being separate from supply means for said film, said means for applying compression acting, in cooperation with said film and other material and without contacting said processing fluid, to cause said processing fluid to permeate said exposed area of said film.

9. Apparatus for processing a photographically exposed photographic film in conjunction with another sheetlike material which is advanced to superposition with said film and in conjunction with a processing fluid which is located between said film and said other sheet material when the latter are superposed, said apparatus comprising, in combination, means defining an exposure opening for exposing said film, means forming a dry processing chamber, means contained within said chamber for bringing at least an exposed surface of said film and a surface of said other material into face-to-face relationship and for applying compression thereto throughout at least an area coextensive with said exposure surface, and means for releasably holding a supply of said other sheetlike material in proximity to said compression-applying means, said last-named means being separate from supply means for said film and being capable of holding a roll of said other material, said means for applying compression acting, in cooperation with said film and other material and without contacting said processing fluid, to cause said processing fluid to permeate said exposed area of film.

10. A camera attachment interchangeable with the back of a conventional camera, said attachment incorporating apparatus for processing a roll film which is supplied and photographically exposed in said camera in conjunction with a roll of another sheetlike material, which is advanced to superimposition with said film, and a processing fluid carried between said superimposed film and other material, said attachment comprising, in combination, casing means for enclosing said apparatus and excluding actinic light therefrom and constituting a dry processing chamber, means, out of contact with said fluid and contained in said chamber, for advancing each exposed portion of said film and a substantially equivalent portion of said other material to face-to-face relationship and for applying compression to said superposed portions, and means for releasably holding a roll of said other material in proximity to said compression-applying means for superimposition with said film as the latter is advanced into said processing chamber, said last-named means being separate from supply means for said film, said means for applying compression acting, in cooperation with said film and other material and without contacting said processing fluid, to spread said processing fluid in the form of a layer throughout facing areas of said materials.

11. Apparatus for photographically exposing a photographic film and for processing said film in conjunction with another sheetlike material which is advanced to superimposition with said film and in conjunction with a viscous processing fluid which is located between said film and said other sheet material when the latter are superposed, said apparatus comprising, in combination, means defining an exposure opening for exposing said film, means forming a dry processing chamber, means, out of contact with said fluid and contained in said chamber, for advancing said film to exposure position and for bringing at least an exposed surface of said film and a surface of said other material into face-to-face relationship and for applying compression thereto throughout at least an area coextensive with said exposed surface, means for releasably holding a supply of said other sheetlike material in proximity to an exposed surface of said film for superimposition therewith after withdrawal of the film from said exposure means, and mounting means for said film separate from said last-named holding means, said means for applying compression acting, in cooperation with said film and other sheet material and without contacting said processing fluid, to spread said processing fluid in the form of a layer throughout facing areas of said materials.

12. Apparatus for photographically exposing a photographic film and for processing said film in conjunction with another sheetlike material which is advanced to superimposition with said film and in conjunction with a viscous processing fluid which is located between said film and said other sheetlike material when the latter are superposed, said other material having formed thereon as a result of said exposure and processing a positive image of the subject matter of said exposure, said apparatus comprising, in combination, means forming an exposure opening for exposing said film, means defining a dry processing chamber, means, out of contact with said fluid and contained in said chamber, comprising a pair of pressure rollers between which said film is advanced from exposure position and brought into face-to-face relationship with said other material, said pressure rollers applying compression to successive increments of said superimposed film and other material as the latter are moved relative thereto, means for releasably holding a supply of said other sheetlike material for superimposition with said film after withdrawal of the film from the camera exposure chamber, and mounting means for said film separate from said last-named holding means, said pressure rollers acting, in conjunction with said film and said other material and without contacting said processing fluid, to spread said processing fluid in the form of a layer throughout predetermined facing areas of said materials.

13. Apparatus for photographically exposing a photographic film and for processing said film in conjunction with another sheetlike material which is advanced to superimposition with said film and in conjunction with a viscous processing fluid releasably carried by said other sheetlike material, said apparatus comprising, in combination, casing means forming a light-tight and dry chamber for exposure and processing of said film, means for photographically exposing said film, means, out of contact with said fluid and contained in said dry chamber, for bringing at least an exposed surface of said film and a surface of said other material into face-to-face relationship and for applying compression thereto throughout at least an area coextensive with said exposed surface, means for releasably holding a supply of said other sheetlike material in proximity to an exposed surface of said film for superimposition therewith after withdrawal of the film from said exposure chamber, mounting means for said film separate from said holding means for said sheetlike material, said means for applying compression acting, in cooperation with said film and other material and without contacting said processing fluid, to spread said processing fluid in the form of a layer throughout facing areas of said materials, said chamber comprising a light-shielded aperture enabling said superimposed film and other material to be withdrawn from said chamber, and means providing adjacent said aperture a second chamber, said last-named chamber being impervious to light actinic to said film and of such dimensions as to receive portions of said superimposed materials coextensive with said exposed surface in a single plane, said last-named chamber serving as a repository wherein said materials may be retained for a predetermined period.

14. Apparatus for successively processing each exposed portion of a photographic film comprising a plurality of exposable surface portions in conjunction with another sheetlike material comprising a plurality of surface portions substantially equal in area to said film portions and in conjunction with a viscous processing fluid releasably carried adjacent said surface portions of said last-named sheetlike material, said apparatus comprising, in combination, means defining an exposure opening for exposing said film, means forming a dry processing chamber, means, out of contact with said fluid and contained within said chamber, for advancing each exposed surface portion of said film and a surface portion of said other sheetlike material to face-to-face relationship and for progressively applying compression thereto, means for releasably holding a supply of said other sheetlike material in proximity to said compression-applying means for superimposition with said film after exposure of the latter, mounting means for said film separate from said last-named holding means, said means for applying compression acting, in cooperation with said film and other material and without contacting said processing fluid, to release and spread said processing fluid in the form of a layer throughout facing portions of said materials, means forming a second chamber comprising a light-shielded aperture enabling passage of said superposed film and other material from said compression-applying means into said second chamber, said second chamber being impervious to light actinic to said film and of such dimensions as to receive portions of the superposed materials coextensive with said exposed film portion in a single plane, said last-named chamber serving as a repository wherein said materials may be retained for a predetermined period, and means for severing predetermined lengths of said material.

15. Apparatus for processing a photographically exposed film in conjunction with another sheetlike material which is advanced to superimposition therewith and in conjunction with a processing fluid which is located between said film and other material when the latter are superposed, said apparatus comprising, in combination, means defining an exposure opening for exposing said film, means forming a dry processing chamber, means, out of contact with said fluid and contained in said chamber, for bringing at least an exposed surface of said film and a surface of said other material into face-to-face relationship and for applying compression thereto throughout at least an area coextensive with said exposed area, means for releasably holding a supply of said other sheetlike material in proximity to said compression-applying means for superimposition with said film after exposure of the latter, mounting means for said film separate from said last-named holding means, said means for applying compression acting, in cooperation with said film and other material and without contacting said processing fluid, to spread said processing fluid in the form of a layer throughout facing areas of said materials, and aperture means in said chamber for viewing one of said materials for determining the position of at least said material relative to said compression-applying means.

16. Apparatus for processing each exposed portion of a photographic film comprising a plurality of exposable surface portions in conjunction with another sheetlike material comprising a plurality of surface portions substantially equal in area to said film portions and in conjunction with a viscous processing fluid releasably carried adjacent said surface portions of said last-named sheetlike material, said apparatus comprising, in combination, means defining an exposure opening for exposing said film, means forming a dry processing chamber, means, out of contact with said fluid and contained in said processing chamber, for successively advancing each exposed surface portion of film and a surface portion of said other sheetlike material to face-to-face relationship and for applying compression thereto throughout portions coextensive with said exposed surface portions of film, means for releasably holding a supply of said other sheetlike material in proximity to said compression-applying means for superimposition with said film after exposure thereof, supply means for said film separate from said holding means, said means for applying compression acting, in cooperation with said film and other material and without contacting said processing fluid, to release and spread said processing fluid in the form of a layer throughout facing portions of said materials, said chamber means comprising a light-shielded aperture enabling passage of said superposed film and other material from said chamber, and second chamber means formed in part by a casing portion pivotally attached to said first-named chamber means, said second chamber, when closed, being impervious to actinic light and serving as a repository wherein said materials may be received from said processing chamber and retained for a predetermined period for completion of processing, said pivotal casing portion, when opened, providing access to said materials whereby the same may be removed from said second-named chamber.

EDWIN H. LAND.

REFERENCES CITED

The following references are of record in the file of this patent:

UNITED STATES PATENTS

| Number | Name | Date |
|---|---|---|
| 642,877 | Peck et al. | Feb. 6, 1900 |
| 1,057,712 | Crompton | Apr. 1, 1913 |
| 1,424,816 | Grillone | Aug. 8, 1922 |
| 2,352,014 | Rott | June 20, 1944 |